(12) United States Patent
Udo

(10) Patent No.: US 11,024,472 B2
(45) Date of Patent: Jun. 1, 2021

(54) SWITCH DEVICE

(71) Applicant: HONDA MOTOR CO., LTD., Tokyo (JP)

(72) Inventor: Takeshi Udo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/816,689

(22) Filed: Mar. 12, 2020

(65) Prior Publication Data
US 2020/0312580 A1 Oct. 1, 2020

(30) Foreign Application Priority Data

Mar. 29, 2019 (JP) .............................. JP2019-065958

(51) Int. Cl.
*H01H 3/06* (2006.01)
*H01H 13/02* (2006.01)
*H01H 3/02* (2006.01)
*B60J 7/057* (2006.01)

(52) U.S. Cl.
CPC ............ *H01H 3/06* (2013.01); *H01H 13/023* (2013.01); *B60J 7/057* (2013.01); *E05Y 2400/854* (2013.01); *H01H 2003/028* (2013.01)

(58) Field of Classification Search
CPC .. H01H 3/06; H01H 13/023; H01H 2003/028; H01H 3/02; E05Y 2400/854; B60J 7/057
USPC ........................................ 200/339, 315, 553
See application file for complete search history.

(56) References Cited

U.S. PATENT DOCUMENTS

| 10,614,978 B2* | 4/2020 | Bechtel | B60K 37/06 |
| 10,650,992 B2* | 5/2020 | Kobayashi | H01H 1/5833 |
| 2013/0233684 A1* | 9/2013 | Kato | H01H 23/143 |
| | | | 200/339 |
| 2016/0035508 A1* | 2/2016 | Murata | H01H 13/023 |
| | | | 200/313 |

FOREIGN PATENT DOCUMENTS

JP 2006-302751 11/2006

OTHER PUBLICATIONS

Japanese Office Action dated Feb. 9, 2021, English translation included, 5 pages.

* cited by examiner

*Primary Examiner* — Edwin A. Leon
*Assistant Examiner* — Lheiren Mae A Caroc
(74) *Attorney, Agent, or Firm* — Rankin, Hill & Clark LLP

(57) ABSTRACT

An operation element is disposed in a recess provided in a lower surface of a controller attached to a vehicle ceiling part, and the operation element comprises an inclined portion inclined at an upward gradient from a vehicle front toward a vehicle rear, a protruding portion formed by the inclined portion, and provided on a vehicle front side of a point, on the operation element, that has an equal distance from opposite ends of the operation element in a front-back direction, and an operating rotary shaft disposed on a side of the protruding portion.

5 Claims, 4 Drawing Sheets

SWITCH DEVICE

INCORPORATION BY REFERENCE

The present application claims priority under 35 U.S.C. § 119 to Japanese Patent Application No. 2019-065958 filed on Mar. 29, 2019. The content of the applications is incorporated herein by reference in its entirety.

BACKGROUND OF THE INVENTION

Field of the Invention

The present invention relates to a switch device.

Description of the Related Art

In general, a switch device is used which operates to open and close a power window such as an electric window or an electric sunroof provided in a car. In this case, a technology that prevents the power window from being incorrectly operated due to an incorrect operation of the switch device is developed.

As this conventional technology, a switch device is disclosed in which, for example, an operation unit comprises a first pushbutton, a second pushbutton disposed in parallel with the first pushbutton, and a protruding portion located between the first pushbutton and the second pushbutton and protruding from the first and second pushbuttons (e.g., see Japanese Patent Laid-Open No. 2006-302751).

SUMMARY OF THE INVENTION

Technical Problem

In a technology described in the above patent literature, first and second pushbuttons can be prevented from being depressed by mistake, to prevent an incorrect operation of a power window, but during an operation by an operator, the first and second pushbuttons cannot be sufficiently depressed by a protruding portion, thereby causing problem that an operability is remarkably poor.

An aspect of the present invention has been developed in view of the above described respect, and it is an object of the aspect of the present invention to provide a switch device that can prevent an incorrect operation and improve an operability.

Solution to Problem

To achieve the above object, according to an aspect of the present invention, provided is a switch device actuated by a tilt operation of an operation element, and characterized in that the operation element is disposed in a recess provided in a lower surface of a controller attached to a vehicle ceiling part, and the operation element comprises an inclined portion inclined at an upward gradient from a vehicle front toward a vehicle rear, a protruding portion formed by the inclined portion, and provided on a vehicle front side of a point, on the operation element, that has an equal distance from opposite ends of the operation element in a front-back direction, and an operating rotary shaft disposed on a side of the protruding portion.

Thus, the protruding portion and the rotary shaft disposed on the side of the protruding portion are provided, so that the tilt operation is not performed even when a part of the operation element on the side of the protruding portion is depressed by the rotary shaft, to prevent an incorrect operation of the operation element, thereby improving safety.

The above configuration is characterized in that the operation element includes a tilt operation surface on a vehicle rear side of the rotary shaft.

Thus, the tilt operation surface is provided on the vehicle rear side of the rotary shaft, so that a large region of the tilt operation surface in the operation element can be acquired, and the operation element can have an operability improved.

The above configuration is characterized in that a height position of a top of the protruding portion in an up-down direction is above a height position of the lower surface of the controller.

Thus, the whole operation element is located above the height position of the lower surface of the controller, so that an incorrect operation of a portion of the operation element that is on the vehicle rear side of the rotary shaft is prevented, thereby improving the safety. Furthermore, since the operation element includes the inclined portion and the protruding portion is located below, depression of the whole operation element in the recess can be decreased, and the operability of the operation element can be acquired.

The configuration is characterized in that in the inclined portion of the operation element, a display through which light is transmittable is provided, and on a back surface of the operation element, a light source that illuminates the display is provided.

Consequently, the light source allows the display of an operation surface to perform predetermined display, and can improve the operability at night. Furthermore, the inclined portion of the operation element is inclined to be oriented to a driver, and hence, visual recognition of the display by the display can improve.

Advantageous Effect of Invention

According to an aspect of the present invention, a protruding portion and a rotary shaft disposed on a side of the protruding portion are provided. Consequently, even when a part of an operation element on the side of the protruding portion is depressed by the rotary shaft, the operation element can be prevented from performing a tilt operation, to prevent an incorrect operation of the operation element, thereby improving the safety.

DETAILED DESCRIPTION OF THE PREFERRED EMBODIMENT

Hereinafter, an embodiment of the present invention will be described with reference to the drawings.

Figure 1:
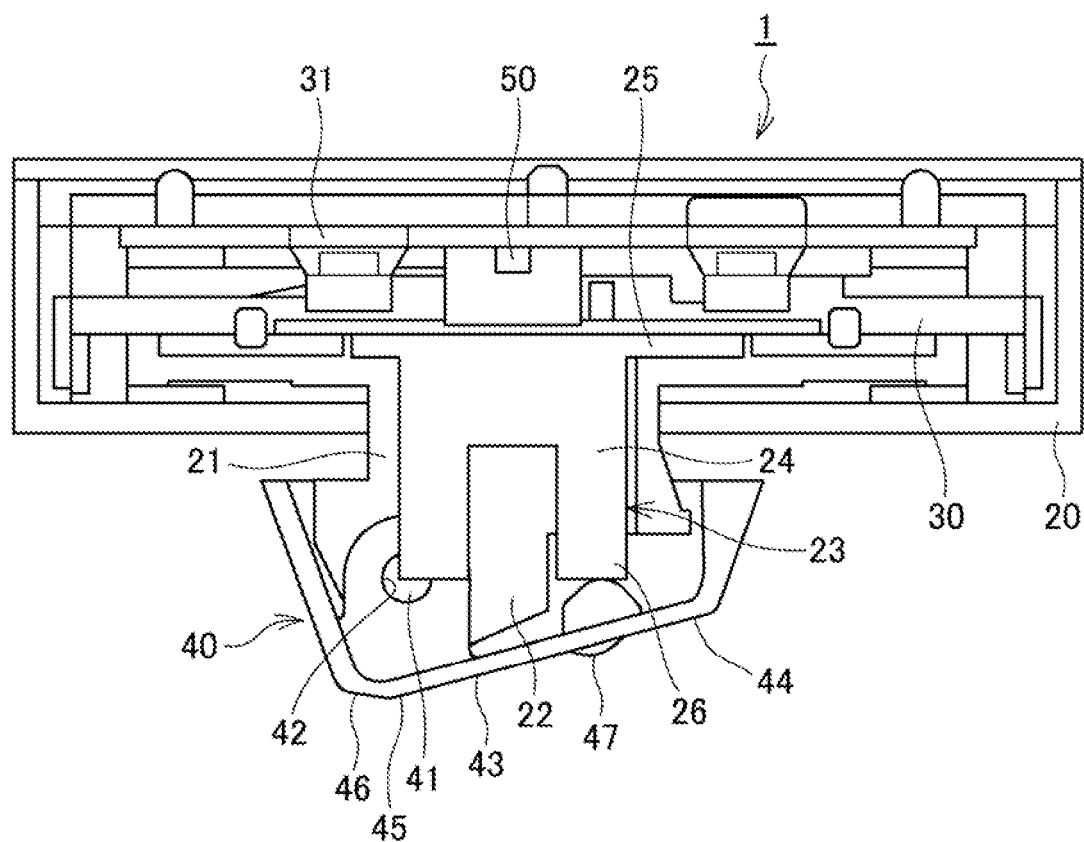
FIG. 1 is a cross-sectional view showing a usual state of a switch device according to a present embodiment.
Figure 2:
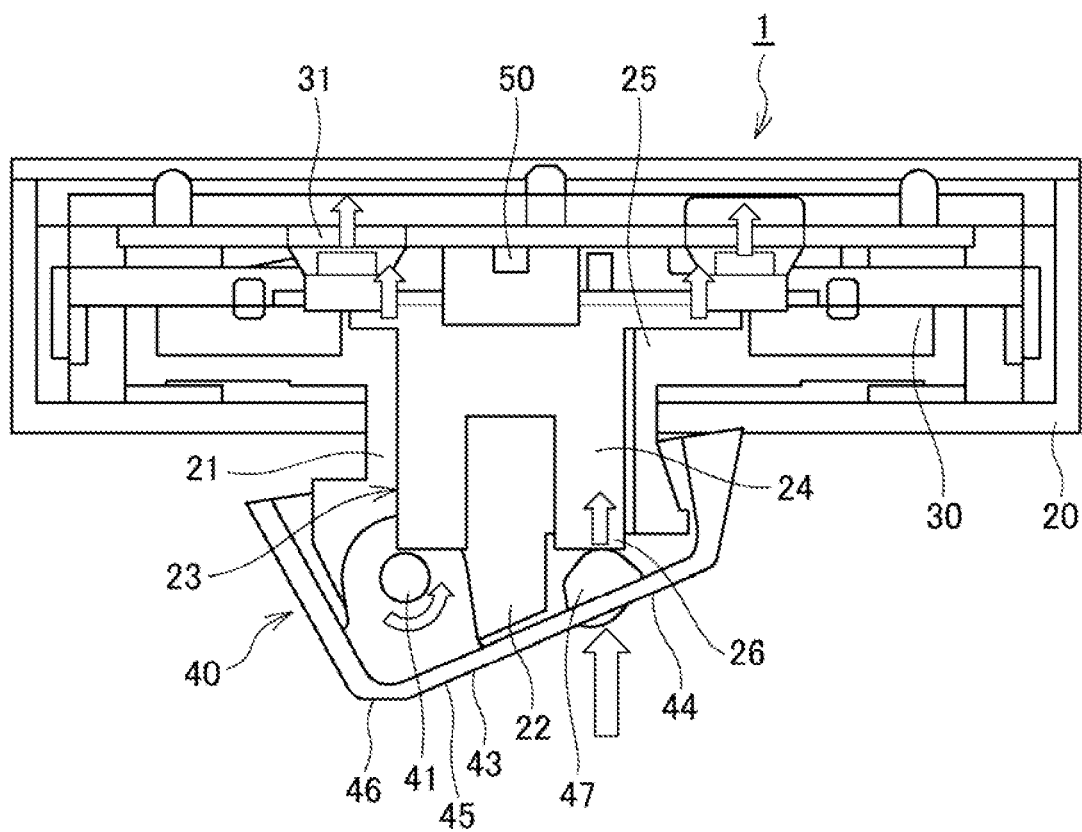
FIG. 2 is a cross-sectional view showing an operation state of the switch device of the present embodiment.
Figure 3:
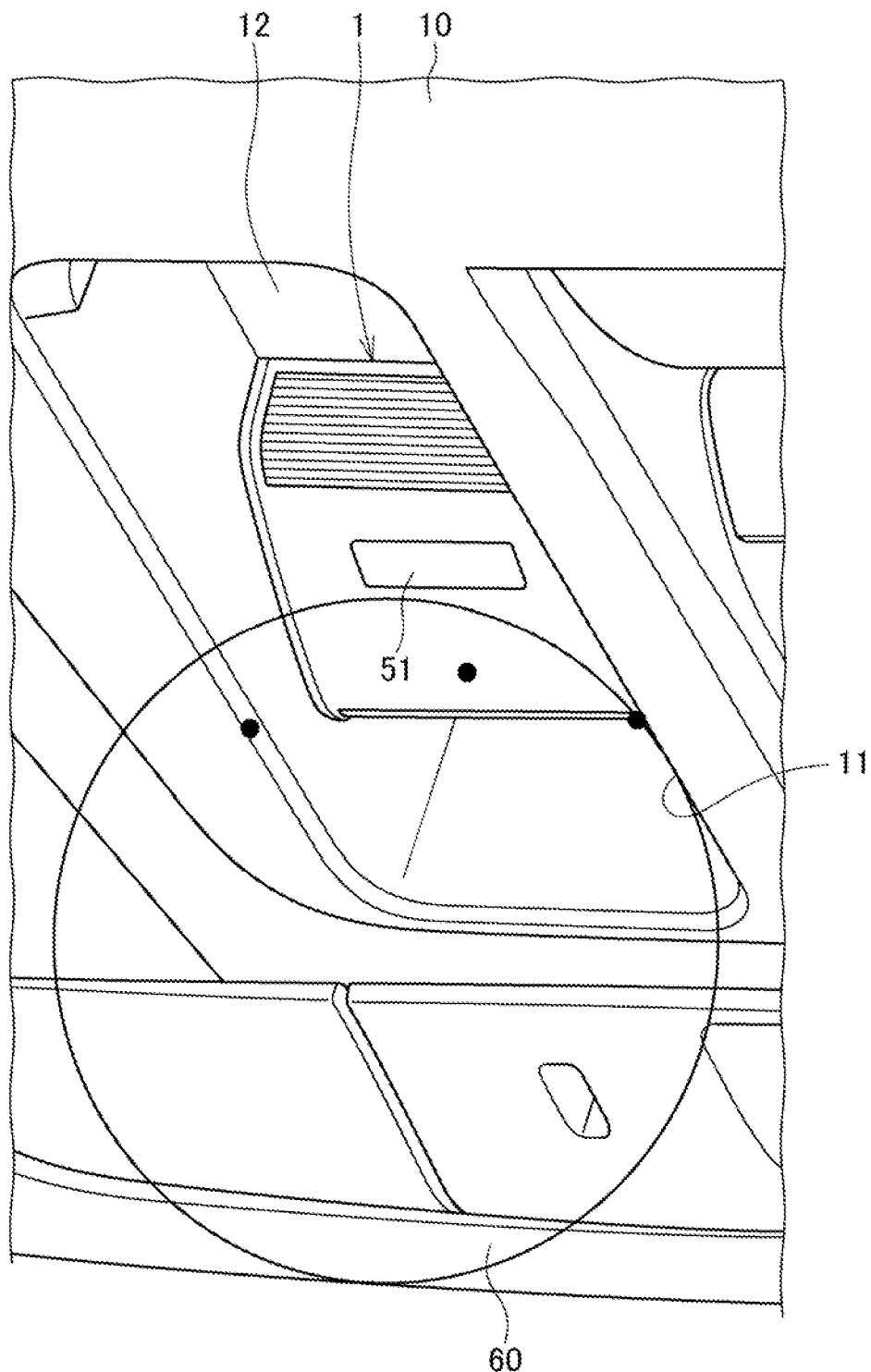
FIG. 3 is a perspective view of the switch device of the present embodiment seen from below.

FIG. 1 is a cross-sectional view showing a usual state of a switch device according to the present embodiment. FIG. 2 is a cross-sectional view showing an operation state of the switch device of the present embodiment. FIG. 3 is a perspective view of the switch device of the present embodiment seen from below.

A switch device 1 is provided in a controller 10 disposed in a vehicle ceiling part (not shown). In the present embodiment, the controller 10 is formed as a roof module including a housing and an electric circuit disposed inside of the housing, and is configured to control opening/closing (slide) driving and tilt driving of a sunroof (not shown) of the vehicle.

In a lower surface of the controller 10, an almost quadrangular recess 11 is formed. The switch device 1 is installed on a bottom surface 12 of the recess 11.

The switch device 1 comprises a box-shaped housing 20.

In an interior of the housing 20, a support block 21 is provided. In an almost central part of a lower surface of the support block 21, a support protrusion 22 exposed downward from the housing 20 is provided.

Inside the support block 21, a pushing member 23 is provided. The pushing member 23 comprises a moving portion 24 supported by the support protrusion 22 to be movable in an up-down direction, and a flat plate 25 provided in an upper portion of the moving portion 24. At a lower end of the moving portion 24, a pushing portion 26 exposed from a lower end face of the support protrusion 22 is provided.

A switch drive member 30 is attached to the flat plate 25 of the pushing member 23. For example, a switching contact 31 comprising a rubber contact or the like is attached to the switch drive member 30.

Furthermore, the switch drive member 30 is configured to perform an on/off operation of the switching contact 31, and the on-operation of the switching contact 31 causes the controller 10 to control the tilt driving of the sunroof. Furthermore, an on-operation of an unshown another switching contact causes the controller 10 to control slide driving of the sunroof.

At a lower end of the support block 21, an operation element 40 is provided. On one side of the lower end of the support block 21, a rotary shaft 41 is provided. The operation element 40 includes a bearing 42 to be engaged with the rotary shaft 41.

The bearing 42 is engaged with the rotary shaft 41, so that the operation element 40 is attached to the support block 21 to be rotatable about the rotary shaft 41.

In a lower surface of the operation element 40, formed is an inclined portion 43 inclined at an upward gradient so that the portion is lowered on a front-end side of the portion to be oriented to a driver of the vehicle, and is raised rearward. The inclined portion 43 forms a tilt operation surface 44 configured to perform a tilt operation of the operation element 40.

A protruding portion 45 is formed on a vehicle front side of a point, on the operation element 40, that has an equal distance from opposite ends of the operation element 40 in a front-back direction. A top 46 located at a lowermost position of the protruding portion 45 is located on a vehicle front side of the rotary shaft 41.

A height position of the top 46 of the protruding portion 45 in the up-down direction is above a height position of the lower surface of the controller 10.

In the present embodiment, the tilt operation surface 44 is provided from a vehicle front to a vehicle rear via the rotary shaft 41, so that a large region of the tilt operation surface 44 in the operation element 40 can be acquired, and the operation element 40 can have an operability improved.

On a vehicle rear side of the rotary shaft 41 of the operation element 40, a tilt operating portion 47 is provided. The tilt operating portion 47 rotates the operation element 40 about the rotary shaft 41 in a counterclockwise direction in FIG. 1, so that a lower end face of the pushing portion 26 of the pushing member 23 can be pushed upward.

Furthermore, the operation element 40 is configured to perform a slide operation together with the support block 21 along a lower surface of the housing 20. In this case, when the operation element is slid rightward in FIG. 1, the sunroof opens, and when the operation element is slid leftward, the sunroof closes.

Furthermore, when the switching contact 31 is operated to turn on by the tilt operation of the operation element, the controller 10 controls the tilt driving of the sunroof. Additionally, when another switching contact is turned on by the slide operation of the operation element, the controller 10 controls slide driving of the sunroof.

In the interior of the housing 20, a light source 50 such as an LED is provided. Furthermore, a display 51 that transmits light to display predetermined information is formed in the inclined portion 43 that is the tilt operation surface 44 of the operation element 40. Then, the light source 50 is lit, and thereby allows the display 51 of the inclined portion 43 to perform predetermined display.

In this case, since the inclined portion 43 of the operation element 40 is formed to be oriented to the driver, visual recognition of the display by the display 51 can improve.

Here, to prevent an incorrect operation of the switch device 1, it is required by law in some overseas countries that the switch device 1 does not operate in a case where a predetermined load is applied to the switch device 1 from a center of gravity of a spherical body 60 by the spherical body 60 having a predetermined diameter.

In the present embodiment, the height position of the top 46 of the protruding portion 45 of the operation element 40 in the up-down direction is above a height position of a lower surface of a recess 11 of the controller 10. In a case where the load is applied by the spherical body 60, the surface of the spherical body 60 abuts on opposite side edges of the recess 11 and the operation element 40 as shown by black points in FIG. 3. At this time, a peripheral edge of the recess 11 receives the load of the spherical body 60, and the spherical body 60 abuts on the operation element 40, but in such a configuration, the operation element 40 is not operated by the load applied to the operation element 40.

Figure 4:
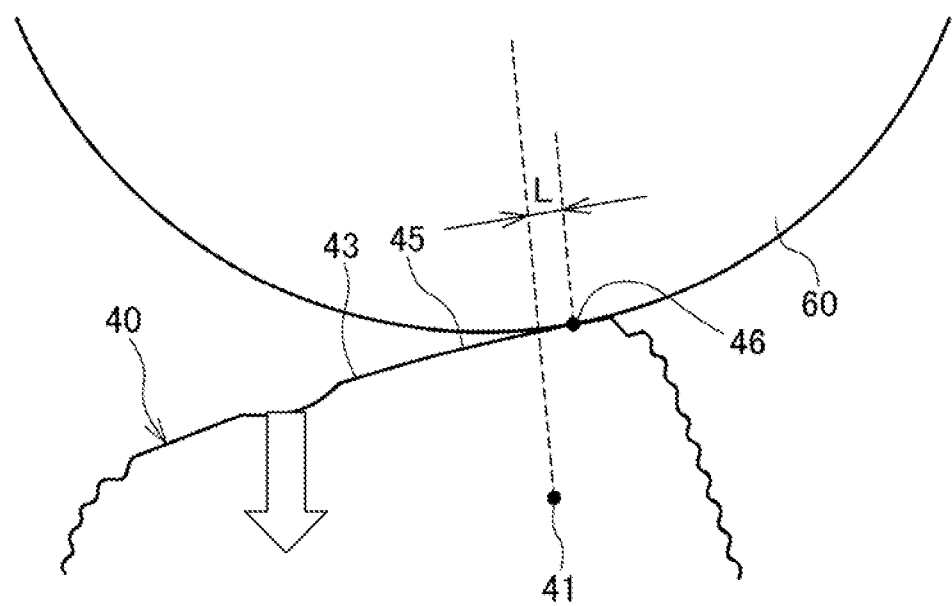
FIG. 4 is an explanatory view showing a state where a spherical body abuts on the switch device of the present embodiment.

FIG. 4 is an explanatory view showing a state where the spherical body 60 abuts on the switch device 1 of the present embodiment.

As shown in FIG. 4, if the spherical body 60 comes in contact with the operation element 40, the spherical body 60 comes in contact with the top 46 of the protruding portion 45 of the operation element 40.

In the present embodiment, the top 46 of the protruding portion 45 is shifted as much as a distance L from the rotary shaft 41 to the vehicle front. Therefore, even in a case where the spherical body 60 comes in contact with the protruding portion 45 to apply the load, a clockwise force about the rotary shaft 41 is applied to the operation element 40 in FIG. 4, and hence, the operation element 40 does not rotate.

Furthermore, similarly in a case where the spherical body 60 is loaded, a part of the surface of the spherical body 60 abuts on the operation element 40, and hence, a slight load is applied to the operation element 40.

In this case, a reaction force to be applied to the operation element increases against a force to be applied from the spherical body 60 to the operation element in a sliding direction to a closed side, and hence, the operation element does not operate. This can prevent the sunroof from being inadvertently and automatically closed.

Next, an operation of the present embodiment will be described.

In a case where the tilt operation of the sunroof is performed, the operation element 40 is operated, to rotate the operation element 40 about the rotary shaft 41. Consequently, the tilt operating portion 47 of the operation element 40 abuts on a lower surface of the pushing portion 26, and the tilt operating portion 47 moves the pushing member 23 upward.

When the pushing member 23 is moved upward, the switching contact 31 is electrically connected via the switch drive member 30 attached to the pushing member 23, and the switching contact 31 can be turned on.

When the switching contact 31 is turned on, the tilt operation of the sunroof is performed via the controller 10.

In this case, the height position of the top 46 of the protruding portion 45 of the operation element 40 in the up-down direction is above the height position of the lower surface of the recess 11 of the controller 10. In a case where the load is centrally applied by the spherical body 60, the spherical body 60 can be received by the peripheral edge of the recess 11, and the load of the spherical body 60 can be prevented from being applied to the operation element 40. Therefore, an incorrect operation of the tilt operation surface 44 of the operation element 40 on the vehicle rear side of the rotary shaft 41 is also prevented, and safety improves.

Furthermore, if the spherical body 60 comes in contact with the operation element 40, the spherical body 60 comes in contact with the top 46 of the protruding portion 45 of the operation element 40, and the clockwise force about the rotary shaft 41 is applied. Consequently, the operation element 40 can be prevented from being rotated.

Additionally, in the present embodiment, the tilt operation surface 44 is provided from the vehicle front to the vehicle rear via the rotary shaft 41, so that the large region of the tilt operation surface 44 in the operation element 40 can be acquired, and the operation element 40 can have the operability improved.

Furthermore, since the display 51 is formed in the inclined portion 43 of the operation element 40, the light source 50 is lit, and thereby allows the display 51 of the inclined portion 43 to perform the predetermined display, and since the operating portion of the operation element 40 is inclined to be oriented to the driver, the visual recognition of the display by the display 51 can improve.

As described above, in the present embodiment, the operation element 40 is disposed in the recess 11 provided in the lower surface of the controller 10 attached to the vehicle ceiling part, and the operation element 40 comprises the inclined portion 43 inclined at the upward gradient from the vehicle front toward the vehicle rear, the protruding portion 45 formed by the inclined portion 43, and provided on the vehicle front side of the point on the operation element 40 that has the equal distance from the opposite ends of the operation element 40 in the front-back direction, and the operating rotary shaft 41 disposed on the side of the protruding portion 45.

Thus, the protruding portion 45 and the rotary shaft 41 disposed on the protruding portion 45 side are provided, so that the tilt operation is not performed even when a part of the operation element 40 on the protruding portion 45 side is depressed by the rotary shaft 41, to prevent the incorrect operation of the operation element 40, thereby improving the safety.

Furthermore, in the present embodiment, the operation element 40 includes the tilt operation surface 44 on the vehicle rear side of the rotary shaft 41.

Thus, the tilt operation surface 44 is provided on the vehicle rear side of the rotary shaft 41, so that the large region of the tilt operation surface 44 in the operation element 40 can be acquired, and the operation element 40 can have the operability improved.

Additionally, in the present embodiment, the height position of the top 46 of the protruding portion 45 in the up-down direction is above the height position of the lower surface of the recess 11 of the controller 10.

Thus, the whole operation element 40 is located above the height position of the lower surface of the controller 10, so that the incorrect operation of a portion of the operation element 40 that is on the vehicle rear side of the rotary shaft 41 is prevented, thereby improving the safety. Furthermore, since the operation element 40 includes the inclined portion 43 and the protruding portion 45 is located below, depression of the whole operation element 40 in the recess 11 can be decreased, and the operability of the operation element 40 can be acquired.

Furthermore, in the present embodiment, in the inclined portion 43 of the operation element 40, the display 51 through which light is transmittable is provided, and on a back surface of the operation element 40, the light source 50 that illuminates the display 51 is provided.

Consequently, the light source 50 allows the display 51 of the inclined portion 43 to perform the predetermined display, and can improve the operability at night. Furthermore, the inclined portion 43 of the operation element 40 is inclined to be oriented to the driver, and hence, visual recognition of the display by the display 51 can improve.

The above embodiment is merely an implementation of the present invention, and can be arbitrarily modified and applied without departing from a gist of the present invention.

For example, in the above embodiment, the switch device to operate the sunroof of the vehicle has been described, and the embodiment is also applicable as a switch device to operate a power window or the like of the vehicle.

REFERENCE SIGNS LIST 1 switch device
10 controller
11 recess
20 housing
21 support block
23 pushing member
40 operation element
41 rotary shaft
44 tilt operation surface
45 protruding portion
46 top
47 tilt operating portion
50 light source
51 display
60 spherical body

What is claimed is:

1. A switch device actuated by a tilt operation of an operation element, wherein the operation element is disposed in a recess provided in a lower surface of a controller attached to a vehicle ceiling part,
wherein
the operation element is supported in the recess by a support block, the operation element comprises:
    an inclined portion inclined at an upward gradient from a vehicle front toward a vehicle rear;
    a protruding portion that is formed by the inclined portion and that has a top that is a lowermost end of the inclined portion, the top being provided on a vehicle front side of a point on the operation element that has an equal distance from opposite ends of the operation element in a front-back direction; and
    a rotary shaft disposed on a side of the protruding portion the vehicle front side of the point, the rotary shaft rotatably attaches the operation element to the support block,
the inclined portion forms a tilt operation surface that tilts so that the rotary shaft is at a center of rotation, and
the top is disposed on the inclined portion, on a vehicle front side of the rotary shaft a predetermined distance from the rotary shaft to the vehicle front.

2. The switch device according to claim 1, wherein the operation element includes the tilt operation surface on a vehicle rear side of the rotary shaft.

3. The switch device according to claim 1, wherein a height position of the top of the protruding portion in an up-down direction is above a height position of the lower surface of the controller.

4. The switch device according to claim 1, wherein in the inclined portion of the operation element, a display through which light is transmittable is provided, and
    on a back surface of the operation element, a light source that illuminates the display is provided.

5. The switch device according to claim 1, wherein the operation element is supported in the recess by the support block, and the support block is slidable in the front-back direction.

* * * * *